UNITED STATES PATENT OFFICE.

WILHELM GRÜTTEFIEN, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

DIOXYPHENYL-ALPHA-PROPANOLAMIN.

1,044,778.     Specification of Letters Patent.     Patented Nov. 19, 1912.

No Drawing.     Application filed April 26, 1912. Serial No. 693,452.

*To all whom it may concern:*

Be it known that I, WILHELM GRÜTTEFIEN, doctor of philosophy, chemist, citizen of the German Empire, residing at Vohwinkel, near Elberfeld, Germany, have invented new and useful Improvements in Dioxyphenyl-Alpha-Propanolamin, of which the following is a specification.

I have found that the hitherto unknown dioxyphenyl-alpha-propanolamin

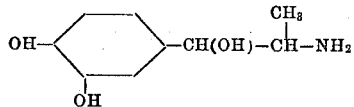

can be obtained by reducing the alpha-aminopropionylpyrocatechin M. P. 212° C.

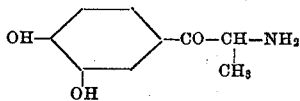

by means of metals of the platinum group and hydrogen.

The racemic product thus obtained can be resolved into the two optically active bases by means of the dextro- and levo-tartaric acid. The new products have the valuable therapeutic property of increasing the blood-pressure in the same way as the substance contained in the suprarenal glands.

In order to illustrate the new process more fully the following example is given, the parts being by weight:—5 parts of palladious chlorid and 10 parts of gum arabic are dissolved in 300 parts of hot water together with a small quantity of dilute hydrochloric acid. The resulting solution is reduced with hydrazin hydrate, 100 parts of the hydrochlorid of alpha-aminopropionyl-pyrocatechin (M. P. 236° C.) are added thereto and the mixture is brought into a pressure flask. Into this flask at a temperature of about 20° C. and under a pressure of 1 atmosphere hydrogen is introduced during 2-3 days until the reduction is complete.

Subsequently 300 parts of acetone are added, the liquid is filtered and the filtrate is evaporated at 50° C. *in vacuo*. The residue is dissolved in water and the product is precipitated with 20 per cent. ammonia solution, filtered off, washed with alcohol, ether and acetone and dried. It melts at 204° C. The hydrochlorid (free from crystal alcohol) melts at 177° C. It is soluble in water giving with $FeCl_3$ a deep green coloration. The product thus obtained can be resolved into the active compounds by means of levo- or dextro-tartaric acid. The dextro-base is a white powder melting at 217° C. It is dextro-rotatory $$\alpha - D = +33.75°.$$

The levo-base melts at 218° C. It is levo-rotatory $$\alpha - D = -30.00°.$$

I claim:—

1. The new dioxy-phenyl-alpha-propanolamin

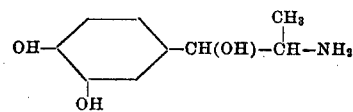

melting at 204° C., in the form of its hydrochlorid melting at 177° C., which can be resolved into optically active compounds, the dextro-base melting at 217° C., the levo-base at 218° C., all possessing valuable properties, substantially as described.

2. The new dioxy-phenyl-alpha-propanolamins which are optically active bases possessing valuable therapeutical properties substantially as described.

In testimony whereof I have hereunto set my hand in the presence of two subscribing witnesses.

WILHELM GRÜTTEFIEN. [L. S.]

Witnesses:
   HELEN NUFER,
   ALBERT NUFER.